United States Patent
Furuya et al.

(10) Patent No.: US 7,152,987 B2
(45) Date of Patent: Dec. 26, 2006

(54) INSTRUMENT FOR VEHICLE

(75) Inventors: Yoshiyuki Furuya, Shizuoka (JP); Takanori Watanabe, Shizuoka (JP); Ichiro Kataoka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/308,034

(22) Filed: Dec. 3, 2002

(65) Prior Publication Data

US 2003/0123259 A1   Jul. 3, 2003

(30) Foreign Application Priority Data

Dec. 27, 2001   (JP) .............................. 2001-397458

(51) Int. Cl.
*G01D 11/28* (2006.01)
(52) U.S. Cl. .............................. 362/26; 362/30; 362/27
(58) Field of Classification Search ............... 362/489, 362/26, 30, 31, 27, 600, 608, 610, 611, 612, 362/620; 349/61–63; 116/286, 288, 284
See application file for complete search history.

(56) References Cited

U.S. PATENT DOCUMENTS

| | | | |
|---|---|---|---|
| 2,664,849 A | | 1/1954 | Nallinger .................... 116/129 |
| 2,761,056 A | * | 8/1956 | Lazo ........................... 362/26 |
| 3,040,168 A | * | 6/1962 | Stearns ........................ 362/27 |
| 3,349,234 A | * | 10/1967 | Schwarz ...................... 362/26 |
| 3,561,145 A | * | 2/1971 | Shotwell ...................... 40/546 |
| 3,737,644 A | * | 6/1973 | Nocek et al. .................. 362/26 |
| 3,853,088 A | * | 12/1974 | Marko ......................... 116/286 |
| 4,115,994 A | * | 9/1978 | Tomlinson ................... 368/241 |
| 4,233,927 A | * | 11/1980 | Oikawa et al. .............. 116/287 |
| 4,510,560 A | | 4/1985 | Negishi ....................... 362/299 |
| 4,737,896 A | | 4/1988 | Mochizuki et al. ......... 362/301 |
| 4,970,400 A | * | 11/1990 | Muramatsu ............... 250/463.1 |
| 5,129,269 A | * | 7/1992 | Iizuka et al. ................ 73/866.3 |
| 6,065,846 A | * | 5/2000 | Kato et al. .................... 362/30 |
| 6,499,852 B1 | * | 12/2002 | Kino et al. .................... 362/23 |
| 6,820,990 B1 | * | 11/2004 | Ewers et al. .................. 362/27 |
| 2002/0163790 A1 | * | 11/2002 | Yamashita et al. ............ 362/31 |

FOREIGN PATENT DOCUMENTS

| | | |
|---|---|---|
| EP | 0 364 228 A2 | 4/1990 |
| FR | 2 479 948 A | 4/1980 |
| JP | 61-151427 | 7/1986 |
| JP | 61-172016 | 8/1986 |
| JP | 280916 | * 3/1990 |
| JP | 11-273437 | 10/1999 |
| JP | 22273437 | * 10/1999 |

* cited by examiner

*Primary Examiner*—Ali Alavi
*Assistant Examiner*—Hargobind S. Sawhney
(74) *Attorney, Agent, or Firm*—Armstrong, Kratz, Quintos, Hanson & Brooks, LLP

(57) ABSTRACT

An instrument for a vehicle, by which an instrument board thereof can be seen as well at night as in the daytime is provided. In the instrument, an illuminating panel 50 including a prism sheet 50a transforms light from an LED 50b into planar light illumination for the instrument board 40, the prism sheet 50a on which prisms arranged in a sawtooth shape to form a prism alley P at a vehicle driver side thereof.

1 Claim, 3 Drawing Sheets

INSTRUMENT FOR VEHICLE

BACKGROUND OF THE INVENTION

1. Field of the Invention

The present invention relates to an instrument for a vehicle, and more particularly to an instrument mounted on a vehicle showing a measured value using a pointer.

2. Description of the Related Art

Generally, a vehicle is provided with indicator type instruments showing a measured value such as a vehicle speed, an engine speed (RPM) and so forth. Such an instrument comprises: an instrument board provided with graduations and scale marks such as figures, characters, signs or so forth on a surface thereof; a pointer disposed in front of the instrument board; internal parts driving the pointer according to the measured value; and a wiring board provided with a circuit pattern and on which the internal parts are fixed.

In this instrument, sunlight illuminates the pointer and the instrument board so that a vehicle driver visually recognizes the measured value in the daytime. While at night, light from a light source such as a cathode ray tube (CRT) or a light emitting diode (LED) is transmitted through an indicating part of the pointer and scale marks, then launched so that the vehicle driver visually recognizes the measured value. A self-luminous instrument as such is well known in this technical field.

However, just the pointer and the scale marks are illuminated to be seen and the instrument board itself cannot be seen in the above-described self-luminous instrument at night. Thus, there is a problem that even if sticking to design, material and etc., to produce a high-class image of the instrument board itself, an observer cannot recognize it visually.

Therefore, as shown in FIG. 5, it is possible that an LED 3 is provided to illuminate an instrument board 1 and a pointer 2 so that the instrument board 1 itself can be seen as well at night as in the daytime. However, when a point source of light such as LED is used to illuminate the instrument board 1 and the pointer 2, there is a fear that the whole instrument board face may not be illuminated uniformly, a high brightness portion A illuminated with high brightness appearing partially as shown in FIG. 6. In particular, when a high reflective metal is used as the instrument board 1 for having a high-class image, such a phenomenon appears conspicuously.

SUMMARY OF THE INVENTION

The present invention has been accomplished to solve the above-described problems and an object of the present invention is to provide an instrument for a vehicle, by which the instrument board thereof can be seen as well at night as in the daytime.

In order to attain the above described object, there is provided, according to a first aspect of the present invention, an instrument mounted on a vehicle comprising an instrument board on which scale marks are graduated correspondingly to measured values, a pointer provided on said instrument board in corresponding to said scale marks, and an optical waveguide member arranged at a vehicle driver side of said instrument board, for transforming emitted light from a light source into planar light illumination for said instrument board.

According to the first aspect of the present invention, the optical waveguide member arranged at the car-driver side of the instrument board transforms light from the light source into planar light illumination for the instrument board. According to above configuration, when lighting the light source, the optical waveguide member transforms the emitted light from the light source into the planar light, launching into the instrument board. Thus, the whole instrument board face is illuminated uniformly without any high brightness portion.

According to the first aspect of the present invention, when lighting the light source, the optical waveguide member transforms the emitted light from the light source into planar light, launching toward the instrument board. Therefore, the whole instrument board is uniformly illuminated without any partially high brightness portion, so that the instrument for a vehicle by which the instrument board thereof can be seen as well at night as in the daytime can be provided.

There is provided, according to a second aspect of the present invention, the instrument mounted on a vehicle as described in the first aspect of the present invention, wherein said optical waveguide member includes a prism sheet on which prisms are arranged in a sawtooth shape to form a prism alley P at a vehicle driver side thereof.

According to the second aspect of the present invention, when light from light source is incident from a side surface paralleled to the prism alley in the prism sheet, the incident light from the side surface is reflected at the reflective surface positioned opposite to the side surface from a top of the prism alley, guided to the instrument board side. Therefore, the incident light from the side surface is not launched into the vehicle driver side directly. The whole incident light is once launched into the instrument board side, then reflected at the instrument board, then guided to the vehicle driver's viewpoint. Therefore, there is no fear that the prism sheet itself is illuminated and the instrument board is hard to be recognized visually.

According to the second aspect of the present invention, the incident light from the side surface may not be launched directly to the vehicle driver, but once launched into the instrument board side entirely, then reflected at the instrument board and guided to the viewpoint of a vehicle driver. Therefore, there is no fear that the prism sheet itself is illuminated and the instrument board is hard to be recognized visually. Thus, the instrument for a vehicle, of which the instrument board can be recognized visually and clearly, can be provided.

There is provided, according to a third aspect of the present invention, the instrument mounted on a vehicle as described in the first or the second aspect of the present invention, wherein said instrument board is made of metal.

According to the third aspect of the present invention, the instrument board is made of metal. Therefore, when lighting the light source, the optical waveguide member transforms the emitted light from the light source into planar light, launching into the metal instrument board. Thus, the whole metal instrument board is illuminated uniformly without any extremely high brightness portion.

According to the third aspect of the present invention, when lighting the light source, the optical waveguide member transforms the emitted light from the light source into planar light, launching into the metal instrument board. Thus, the whole metal instrument board is illuminated uniformly, without any extremely high brightness portion. Therefore, the instrument for a vehicle, by which the instrument board thereof can be seen as well at night as in the daytime, can be provided.

DESCRIPTION OF THE PREFERRED EMBODIMENT

Figure 1:
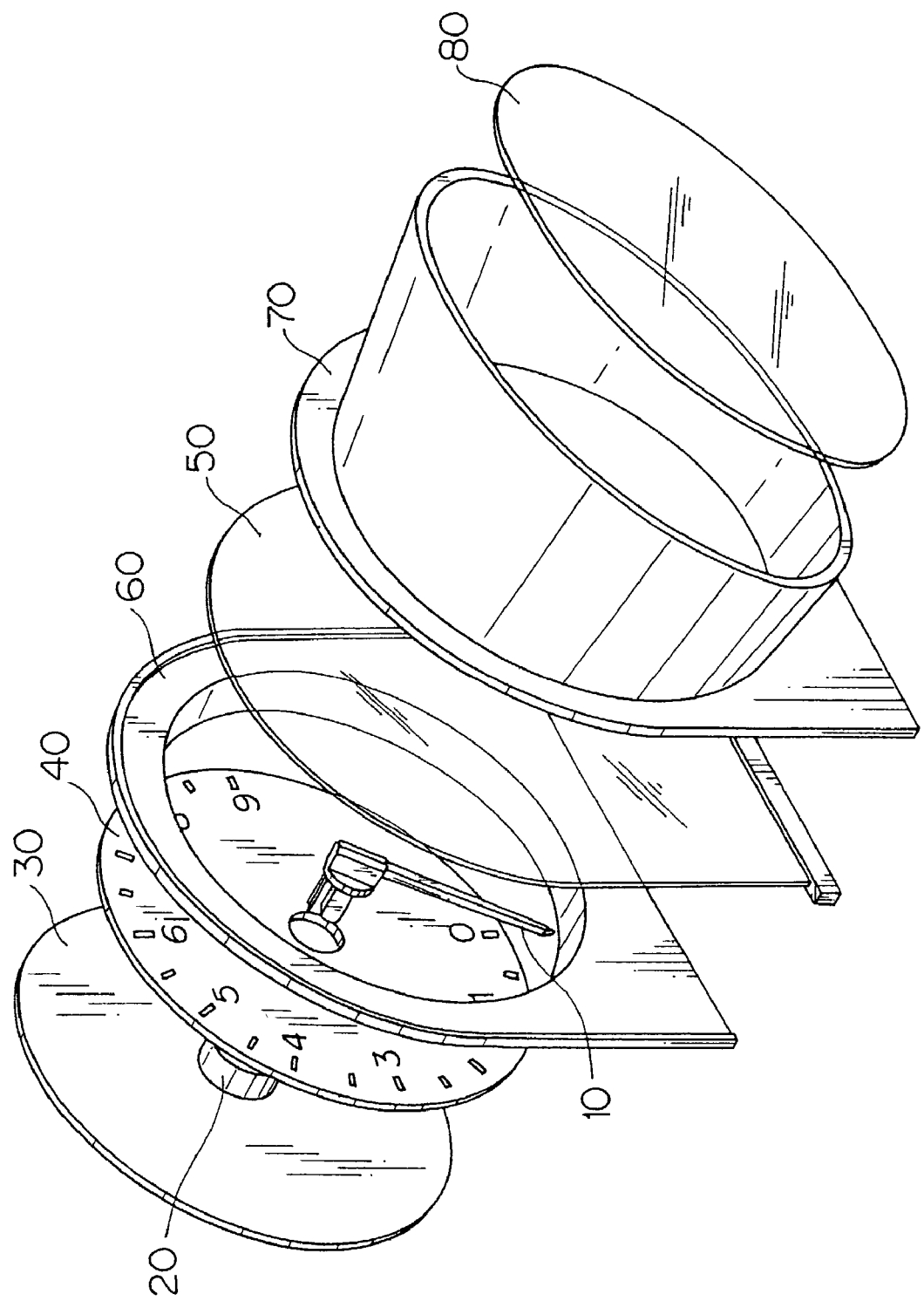
FIG. 1 is an exploded perspective view showing one embodiment of an instrument for a vehicle according to the present invention.
Figure 2:
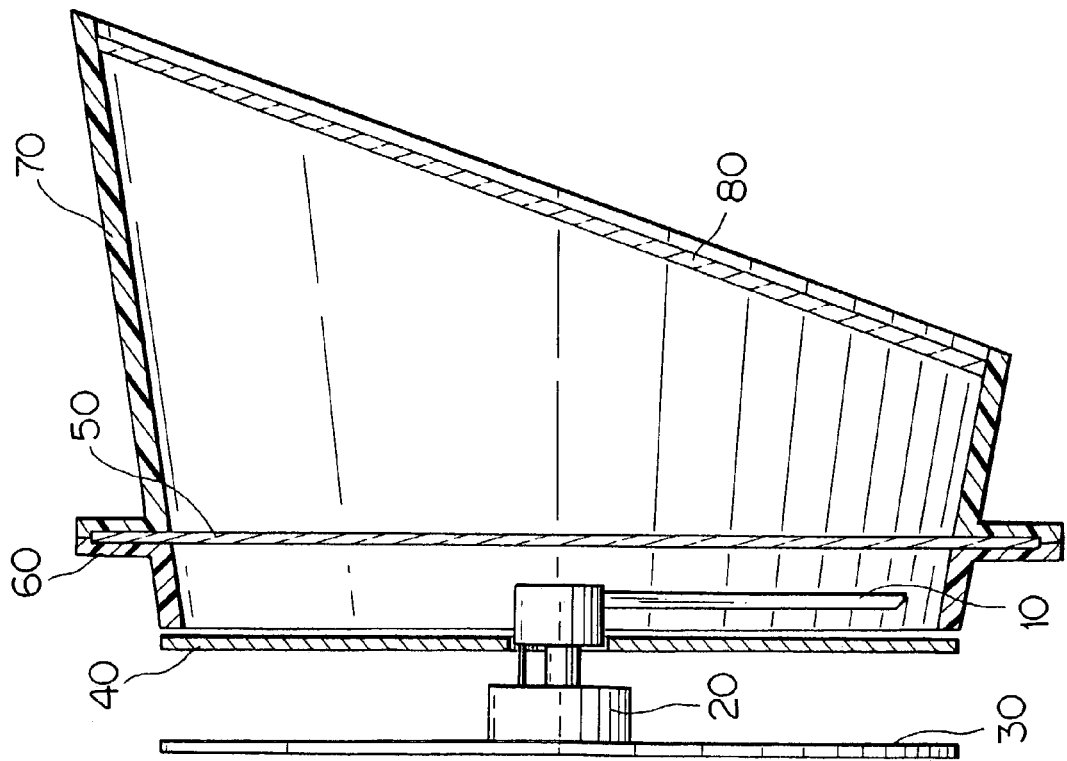
FIG. 2 is a section view showing one embodiment of the instrument for a vehicle according to the present invention.

Now, an embodiment according to the present invention will be described in detail referring to the drawings. FIG. 1 shows an exploded perspective view of one embodiment of an instrument for a vehicle of the present invention. FIG. 2 shows a section view of the embodiment of the instrument for a vehicle of the present invention.

In both figures, an instrument for a vehicle comprises a pointer 10 for indicating a measured value, a substrate 30 to which a movement 20 for rotary driving the pointer 2 is connected, a metal instrument board 40 on which markers corresponding to the measured value indicated by the pointer 10 are printed, and an illuminating panel 50 composed of the optical waveguide member arranged at a vehicle driver side of the metal instrument board 40.

The illuminating panel 50 is supported on a vehicle driver side of the metal instrument board 40 by sandwiching it between a pressure foot 60 of the illuminating panel 50 and a meter visor 70 for hiding an interior of the instrument except the metal instrument board 40. Moreover, a front glass 80 is attached to an opening of the meter visor 70, preventing an entry of dust from the opening.

Figure 3:
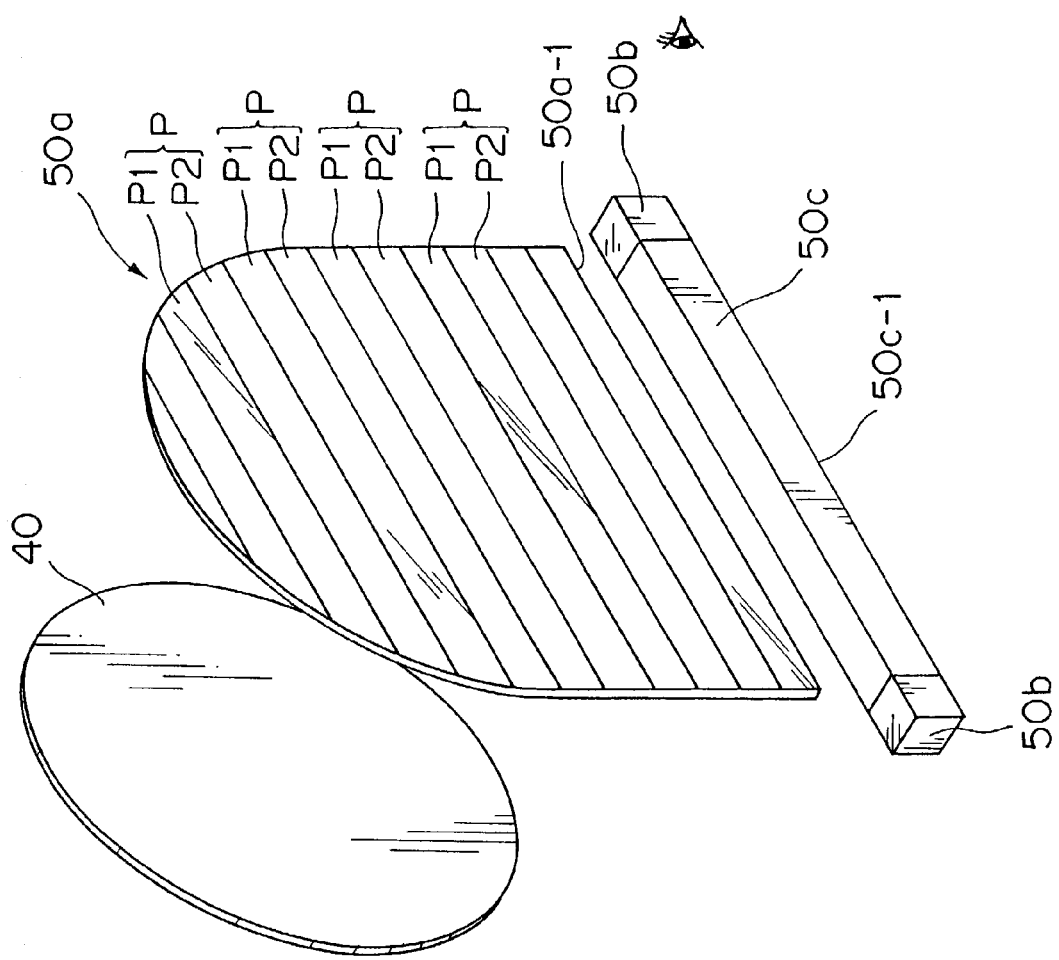
FIG. 3 is a detailed configuration view of an illuminating panel 50 composing the instrument for a vehicle shown in FIG. 1 and FIG. 2.
Figure 4:
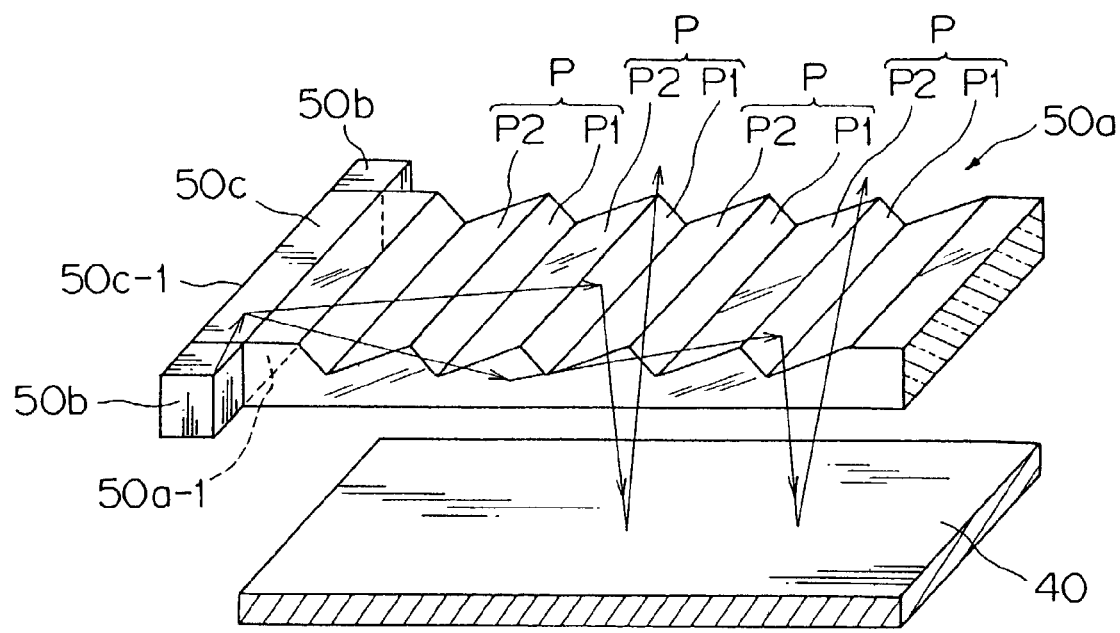
FIG. 4 is another detailed configuration view of the illuminating panel 50 composing the instrument for a vehicle shown in FIG. 1 and FIG. 2.
Figure 5:
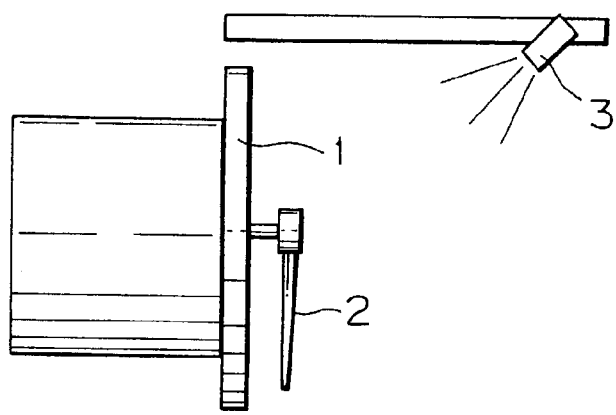
FIG. 5 is a detailed configuration view of a conventional instrument for a vehicle.
Figure 6:
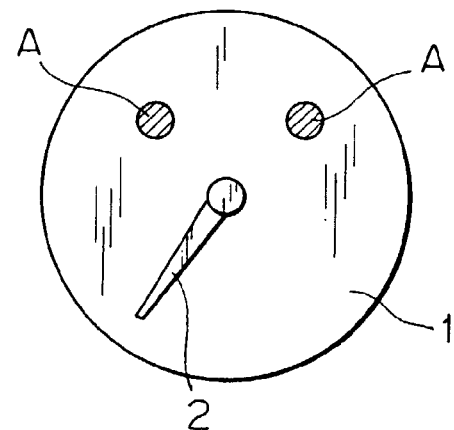
FIG. 6 is an explanatory view for explaining a problem of the conventional instrument for a vehicle.

FIG. 3 and FIG. 4 show a detailed configuration of the above-mentioned illuminating panel 50. As shown in FIG. 3 and FIG. 4, prisms are arranged in a sawtooth shape to form a prism alley P at the vehicle driver side of the illuminating panel 50, the illuminating panel 50 comprising: a prism sheet 50a on which anti-reflection coating is formed at the metal instrument board 40 side; a light emitting diode (hereafter referred to as LED) 50b to emit light for illuminating the metal instrument board 40; and a reflector 50c reflecting the emitted light from the LED 50b toward a side surface 50a-1 parallel to the prism alley P of the prism sheet 50a.

The above mentioned prism alley P is composed of a reflection surface P1 positioned in an opposite side of surface 50a-1 from a top of the alley and an inclined surface P2 positioned in the surface 50a-1 side from the top. A tilt angle of the reflection surface P1 is set so that the incident light from the side surface 50a-1 can be reflected by the reflection surface P1, being launched toward the metal instrument board 40. Moreover, a tilt angle of the inclined surface P2 is set so that the inclined surface P2 can be substantially parallel to the incident light from the side surface 50a-1. Thus, almost all light is neither reflected nor transmitted by the inclined surface P2. Thus, it may not occur that the vehicle driver sees the prism sheet 50a itself lighting, watching the metal instrument board 40 behind the prism sheet 50a with difficulty.

According to the illuminating panel 50 in the above described configuration, as shown in FIG. 4, the emitted light from the LED 50b is reflected by a reflecting surface 50c-1 of a reflector 50c, being launched into the side surface 50a-1 of the prism sheet 50a. Either an incident light from the side surface 50a-1 of the prism sheet 50a or an incident light reflected by a surface of the metal instrument board 40 side of the prism sheet 50a from the side surface 50a-1 is reflected by the reflection surface P1 of the prism alley P, toward the metal instrument board 40. Then the reflected light by the. reflection surface P1 is reflected by the metal instrument board 40, reaching a viewpoint of the vehicle driver.

Namely, planar light is launched from the whole reflection surface P1 toward the metal instrument board 40 in the above described prism sheet 50a. Therefore, since the above described reflection surface P1 is alternately provided with the inclined surface P2 on the whole prism sheet 50a, the whole prism sheet 50a is like surface-emitting, being allowed to illuminate the metal instrument board 40 with a sheet of light.

Moreover, sunlight is incident to the metal instrument board 40 transmitting through the prism sheet 50a in the daytime. The incident light to the metal instrument board 40 reaches the viewpoint of the vehicle driver again transmitting through the prism sheet 50a.

According to the above described configuration of the instrument for a vehicle, the whole metal instrument board 40 is illuminated uniformly from the vehicle driver side by the illuminating panel 50, so even using high reflective metal as an instrument board, no high brightness portion appears. Therefore, the metal instrument board 40 can be seen as well at night as in the daytime and a high-class appearance of the metal instrument board 40 may not be spoiled.

Additionally, the instrument board is made of, but is not limited to, metal in above described embodiment. For example, the instrument board can be made of synthetic resin.

Although the present invention has been fully described by way of examples with reference to the accompanying drawings, it is to be noted that various changes and modifications can be made in a scope of the present invention.

What is claimed is:

1. An instrument mounted on a vehicle, comprising:
    a dial plate having a graduated scale marks corresponding to measured values;
    a pointer disposed on the dial plate corresponding to said graduated scale marks;
    a prism sheet having a prism array of sawtooth-shaped prisms on a surface thereof facing a dnver's seat;
    a light source to emit light into the prism sheet from a side edge thereof along the surface thereof; and
    an illuminating panel formed by the prism sheet and the light source, said illuminating panel covering a surface of the dial plate facing the driver's seat.

* * * * *